Patented July 2, 1935

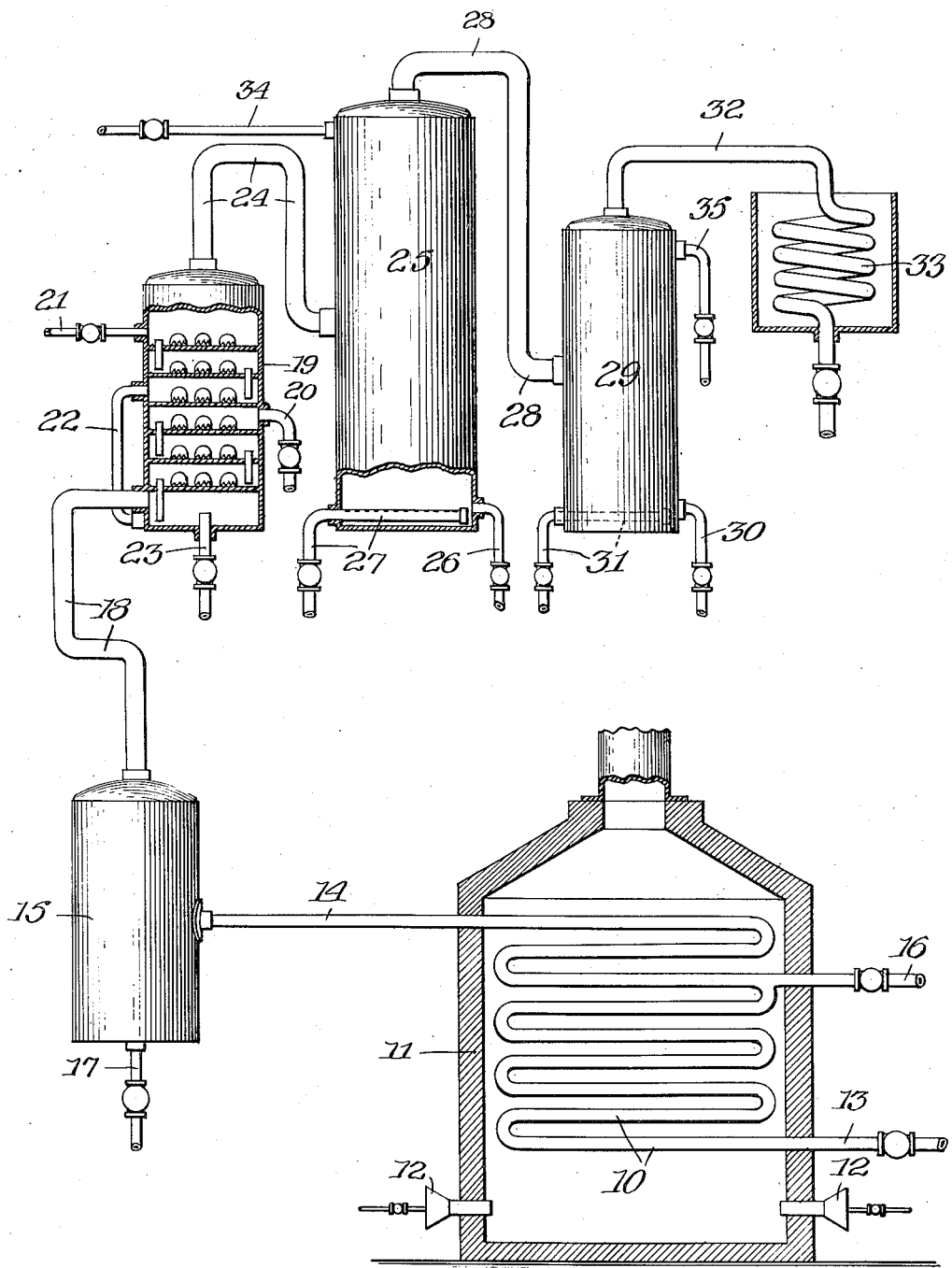

2,007,146

UNITED STATES PATENT OFFICE 2,007,146

REMOVAL OF NAPHTHENIC ACIDS FROM HYDROCARBON OILS

Francis M. Rogers, Whiting, Ind., assignor to Standard Oil Company, Whiting, Ind., a corporation of Indiana Application December 12, 1928, Serial No. 325,504

12 Claims. (Cl. 196—36)

This invention relates to the removal of naphthenic acids from hydrocarbon oils, and will be readily understood from the following description in conjunction with the accompanying drawing, which illustrates diagrammatically a suitable apparatus for effecting such removal.

Referring to the drawing, the numeral 10 designates a pipe-still coil, located in a setting 11 and adapted to be heated by suitable burners 12. The inlet 13 of the coil 10 is provided with a suitable pump (not shown) for forcing the oil through the coil. The inlet 13 may be supplied with the oil from suitable heat exchangers (not shown), whereby the oil is preheated to a substantial extent. The outlet 14 of the coil 10 leads into an enlarged chamber or flash drum 15. At an intermediate point and preferably near the outlet 14, the coil 10 is provided with a pipe 16 adapted to supply steam into the coil for the purpose of assisting in vaporizing the oil passing therethrough.

The flash drum 15 is provided at its base with a tar outlet 17. From the upper end of the flash drum 15 a vapor outlet 18 leads into the base of a bubble tower 19 which contains a substantial number of bubble cap plates through which the vapors ascend. As shown in the drawing, the bubble cap plates constitute two separate groups; the group constituted by the three lowest plates being hereinafter called "the alkali plates" and the group constituted by those above the three lowest plates being hereinafter termed "the entrainment plates".

An inlet 20 leads into the tower for the purpose of supplying caustic solution to the uppermost of the alkali plates while an inlet 21 leads into the tower above the entrainment plates for the purpose of supplying cooling medium thereto. The lowermost entrainment plate is not provided with the usual overflow to the plate beneath, but an exterior by-pass 22 is provided whereby liquid from said lowermost plate is passed into the base of the tower. The tower is provided at its base with a draw-off pipe 23 and at its upper end with a vapor pipe 24 which leads into an intermediate point of a fractionating column 25.

The fractionating column may suitably be of the bubble cap type, and is provided at the bottom with a draw-off conduit 26 and a perforated pipe 27 for supplying open steam and at its upper end with a vapor pipe 28 which leads into an intermediate point of another fractionating column 29.

The fractionating column 29 is provided at its base with a liquid draw-off conduit 30 and a perforated pipe 31 for supplying open steam into the column, and at its upper end with a vapor outlet 32 which leads to a condenser 33 of conventional type.

At their upper ends, the columns 25 and 29 are provided with liquid inlets 34 and 35 for the purpose of supplying cooling medium into said column.

The method of conducting the process is as follows:

The oil containing naphthenic acids is supplied by the inlet 13 to the coil 10. As indicated above, the incoming oil is preferably preheated by heat exchangers and may have a temperature between 250 and 350° F. In passing through the coil 10 the oil is rapidly heated to a high temperature sufficient to volatilize the desired percentage of the oil. This temperature may be in the cracking range since the time of exposure is insufficient to cause any appreciable cracking or deterioration of the lubricating qualities of the oil. A certain amount of steam is preferably introduced by the pipe 16 into the coil 10 so that the desired vaporization may be obtained without excessive temperatures. The heated oil, steam and vapors pass into the flash drum 15. The unvaporized oil or tar is withdrawn by the outlet 17 while the steam and vapors pass into the bottom of the bubble cap tower 19 and pass upwardly through the plates thereof.

A solution of caustic alkali is supplied to the caustic alkali plates by the pipe 20. Caustic soda or caustic potash may be employed, but it is preferred to employ the former, owing to its cheapness and its lower melting point. The highly heated vapors pass upwardly through the caustic alkali plates and substantially evaporate the water therefrom. The caustic alkali remains molten and descends from plate to plate to the bottom of the tower. In passing upwardly through the caustic alkali the oil vapors are substantially deprived of their naphthenic acid content. These vapors then pass upwardly through the entrainment plates. A small amount of reflux is caused to flow down these plates and passes by the pipe 22 from the lowermost entrainment plate into the base of the tower 19. This reflux may suitably be formed by supplying a suitable amount of gas oil or other suitable oil to the uppermost plate. It will be understood, however, that the reflux may be produced in any other suitable way, for example, by passing cooling medium through a coil in the upper part of the tower. A small amount of reflux, excess caustic alkali and alkali naphthenates, etc., are withdrawn by the outlet 23. The vapors pass by pipe 24 into an intermediate point of the fractionating column 25.

Reflux is formed in the column 25 by supplying distillate oil thereto by the pipe 34. It is to be understood that the reflux may be produced in any other known or suitable manner. The reflux oil is stripped in the lower part of the column 25 by open steam introduced by the pipe 27. Lubricating oil of desired quality is withdrawn by the pipe 26, the quality of the oil being controlled by controlling the supply of steam by the pipe 27. The vapors pass by pipe 28 to an intermediate point of the column 29, which is operated in a manner similar to that described in connection with the tower 25, a lighter lubricating oil being withdrawn by the outlet 30. The vapors pass from the column 29 and may be condensed in any suitable manner, for example by condenser 33.

The invention will be readily understood from the following specific example.

Smackover crude oil having a gravity of about 17° API and a naphthenic acidity equivalent to 0.5 mg. KOH per gram of oil is fed to the pipe still at the rate of about 2000 gallons per hour. This oil has been preheated to a temperature of about 300° F. About 5000 lbs. of steam are supplied per hour by pipe 16. The steam and partially vaporized oil leave the pipe still at a temperature of about 750° F. and substantially at atmospheric pressure. Under these conditions, about 27% of tar is separated in the flash drum 15 and withdrawn by the outlet 17.

A 43% solution of caustic soda is fed at the rate of 2½ gallons per hour by the pipe 20 onto the caustic alkali plates. Since the temperature here is about 700° F., the water is largely evaporated and the caustic soda is maintained in a thoroughly molten condition. Substantially all the naphthenic acids are retained by the caustic soda.

A small amount of gas oil is supplied to the entrainment plates by pipe 21 so that a small amount of heavy reflux, suitably about 1% of the crude oil supplied, is formed in the entrainment section and passes by pipe 22 to the base of the tower. This reflux prevents sodium hydroxide or sodium compounds from being carried over by the vapors into the fractionating column 25. This procedure is adopted in order to reduce as far as possible the amount of liquid oil on the caustic plates, as molten caustic soda exerts a strong carbonizing effect at the temperatures involved.

The column 25 is operated to yield by the outlet 26 a lubricating oil having a viscosity of about 350 sec. Saybolt at 100° F. and a flash of 390° F. As indicated above, the column 25 is operated by supplying a controlled quantity of gas oil, or the like, by the pipe 34 and by supplying a controlled quantity of steam by the pipe 27. The acidity of this oil is equivalent to 0.03 mg. KOH per gram of oil. The yield of this oil is about 38% of the original crude oil. This lubricant may suitably be finished by agitating with about 0.2 lbs. of 89% sulfuric acid per gallon of oil, the sludge separated and the sour oil agitated with about 5% of its weight of finely divided fuller's earth and then filtered free from solids. The resulting oil has an acidity of 0.04 mg. KOH per gram of oil and a color of 1 to 2 P. Tag. Robinson scale.

Vapors at a temperature of about 400° F. pass by the pipe 28 to the column 29. This column is also operated by supplying a controlled amount of gas oil by the pipe 35 and a controlled amount of steam by the pipe 31. The oil withdrawn by the pipe 30 has a viscosity of about 50 sec. Saybolt at 100° F., a flash of about 280° F. and an acidity of 0.02 mg. KOH per gram of oil. The yield of this oil is about 5% of the crude oil.

The condensate from the condenser 33 is a gas oil and amounts to about 29% of the original crude.

Although the invention has been described in connection with the details of a specific example thereof, it must be understood that such details are not intended to be limitative of the invention, except in so far as included in the accompanying claims.

What I regard as new, and desire to secure by Letters Patent, is:

1. The method of removing naphthenic acids from hydrocarbon oil, which consists in vaporizing said oil and passing the vapors through molten caustic alkali.

2. The method of removing naphthenic acids from hydrocarbon oil, which consists in vaporizing said oil and passing the vapors through molten caustic soda.

3. The method of removing naphthenic acids from hydrocarbon oil, which consists in vaporizing the said oil, passing the vapors upwardly through a tower, supplying caustic alkali within said tower and through at least one pool of molten caustic alkali in molten, substantially anhydrous form, and causing same to flow downwardly therethrough.

4. The method of removing naphthenic acids from hydrocarbon oil, which consists in vaporizing the said oil, passing the vapors upwardly through a tower and through at least one pool of molten sodium hydroxide, supplying sodium hydroxide within said tower in molten, substantially anhydrous form, and causing same to flow downwardly therethrough.

5. The method of removing naphthenic acids from hydrocarbon oil, which consists in vaporizing said oil, heating the vapors to a temperature above the melting point of sodium hydroxide, passing said vapors upwardly through a tower and through at least one pool of molten sodium hydroxide, supplying sodium hydroxide solution into said tower, whereby substantially all the water is evaporated therefrom and the sodium hydroxide maintained in molten condition, and causing the said molten sodium hydroxide to pass downwardly through said tower in countercurrent to the ascending vapors.

6. The method of removing naphthenic acids from hydrocarbon oil, which consists in vaporizing said oil and passing the vapors upwardly through a tower and through one pool of molten caustic soda, maintaining molten caustic soda in the lower part of said tower and producing a small amount of reflux in the upper part of said tower thereby preventing entrainment of sodium compounds.

7. The method of removing naphthenic acids from hydrocarbon oil, which consists in vaporizing said oil, supplying the vapors to the base of a tower and causing the same to ascend therethrough, causing molten caustic soda to descend through the lower part of said tower, producing a small amount of reflux in the upper part of said tower for the purpose of removing entrained sodium compounds from the vapors and supplying said reflux and entrainment directly from the lowermost part of the upper section to the base of the tower.

8. The method of removing naphthenic acids from hydrocarbon oil, which consists in passing said oil through a pipe-still, thereby vaporizing a part thereof, separating the vapors from the unvaporized oil, causing said vapors to ascend through a tower comprising two superimposed sections, supplying caustic soda solution to the lower section and causing molten caustic soda to descend therethrough, producing a small amount of reflux in the upper section of said tower for the purpose of collecting entrained sodium compounds, supplying said reflux and entrained compounds directly into the base of said tower, by-passing the caustic soda section, withdrawing reflux and sodium compounds from the base of the tower, withdrawing vapors from the top of said tower, and subjecting them to fractional condensation.

9. The method of removing naphthenic acids from hydrocarbon oils, which comprises vaporizing said oil, heating the vapors to a temperature above the melting point of caustic alkali, passing said vapors upwardly through a tower, supplying an aqueous solution of caustic alkali into said tower, whereby substantially all the water of said solution is evaporated and the substantially anhydrous caustic alkali maintained in molten condition, and forming a pool of said caustic alkali and causing the ascending vapors to pass therethrough.

10. The method of removing naphthenic acids from hydrocarbon oil, which comprises vaporizing said oil, heating the vapors to a temperature above the melting point of sodium hydroxide, passing said vapors upwardly through a tower, supplying aqueous sodium hydroxide solution into said tower, whereby substantially all the water of said solution is evaporated and the sodium hydroxide remaining is melted, and maintaining a pool of molten sodium hydroxide and causing the ascending vapors to pass therethrough.

11. The method of removing naphthenic acids from hydrocarbon oil which comprises maintaining a body of molten substantially anhydrous caustic alkali, vaporizing said oil, and passing the oil vapors through said molten caustic alkali body.

12. The method of removing naphthenic acids from hydrocarbon oil which comprises passing said oil in vaporous form through a body of molten alkali, said oil vapors being heated to a temperature above the melting point of the alkali whereby said alkali is maintained in molten condition.

FRANCIS M. ROGERS.